United States Patent
Maher et al.

(10) Patent No.: US 11,620,272 B2
(45) Date of Patent: Apr. 4, 2023

(54) TRUSTED LEDGER MANAGEMENT SYSTEMS AND METHODS

(71) Applicant: Intertrust Technologies Corporation, Sunnyvale, CA (US)

(72) Inventors: David Maher, Philadelphia, PA (US); Jarl Nilsson, Mountain View, CA (US)

(*) Notice: Subject to any disclaimer, the term of this patent is extended or adjusted under 35 U.S.C. 154(b) by 0 days.

(21) Appl. No.: 17/199,387

(22) Filed: Mar. 11, 2021

(65) Prior Publication Data

US 2022/0114156 A1 Apr. 14, 2022

Related U.S. Application Data

(60) Provisional application No. 63/091,876, filed on Oct. 14, 2020.

(51) Int. Cl.
G06F 16/2455 (2019.01)
G06F 16/23 (2019.01)
H04L 9/32 (2006.01)

(52) U.S. Cl.
CPC ...... *G06F 16/2315* (2019.01); *G06F 16/2455* (2019.01); *H04L 9/3242* (2013.01)

(58) Field of Classification Search
CPC . H04L 9/0637; H04L 9/3242; G06F 16/2315; G06F 16/2455
USPC .......................................... 707/770; 380/283
See application file for complete search history.

(56) References Cited

U.S. PATENT DOCUMENTS

| | | | |
|---|---|---|---|
| 9,749,140 B2 * | 8/2017 | Oberhauser | H04L 9/3236 |
| 9,882,918 B1 * | 1/2018 | Ford | H04L 67/306 |
| 9,948,467 B2 * | 4/2018 | King | H04L 63/0876 |
| 10,841,100 B2 * | 11/2020 | Lam | H04L 9/008 |
| 11,102,008 B2 * | 8/2021 | Maher | H04L 9/0844 |
| 2015/0332283 A1 * | 11/2015 | Witchey | G06Q 10/10 705/3 |
| 2017/0317834 A1 * | 11/2017 | Smith | H04L 9/0637 |
| 2017/0330179 A1 * | 11/2017 | Song | G06Q 20/3829 |
| 2017/0346639 A1 * | 11/2017 | Muftic | H04L 9/3247 |
| 2018/0006826 A1 * | 1/2018 | Smith | H04L 9/006 |

(Continued)

OTHER PUBLICATIONS

Website. IP Blindness. Brad Lassey and Paul Jensen, https://github.com/bslassey/ip-blindness. Accessed on or before Feb. 9, 2021. (1 pg).

(Continued)

*Primary Examiner* — Hanh B Thai
(74) *Attorney, Agent, or Firm* — John P. Davis; Thayne and Davis LLC

(57) ABSTRACT

The disclosure relates to, among other things, systems and methods for mitigating the risks of errors, benign or otherwise, occurring within trusted ledgers and/or for validating the integrity of information provided by operators of trusted ledgers. Consistent with embodiments disclosed herein, trusted agents, which may comprise proxy agents and/or test agents, may be employed to examine ledgers and/or derivatives, which may be meshed with other ledgers, to ensure the integrity of information provided by ledger operators. Ledger meshing techniques are described to link ledgers in a manner that improves the ability to verify ledger entries and/or recover from data faults. Further embodiments provide for tagging processes may be performed to give semantic meaning to hashes included in trusted ledgers.

17 Claims, 7 Drawing Sheets

(56) References Cited

U.S. PATENT DOCUMENTS

| | | | |
|---|---|---|---|
| 2018/0068091 A1* | 3/2018 | Gaidar | G06F 21/10 |
| 2018/0183768 A1* | 6/2018 | Lobban | H04L 63/123 |
| 2019/0273617 A1* | 9/2019 | Maher | H04L 9/085 |
| 2019/0296904 A1* | 9/2019 | Smith | G06Q 20/02 |
| 2019/0361867 A1* | 11/2019 | Nilsson | H04L 9/3239 |
| 2019/0363882 A1* | 11/2019 | Levy | H04L 9/3239 |
| 2020/0374343 A1* | 11/2020 | Novotny | G06F 16/9024 |

OTHER PUBLICATIONS

Reiter et al. Crowds: anonymity for Web transactions. ACM Transactions of Information and System Security, vol. 1, Issue 1. pp. 66-92. Nov. 1998. (23 pgs).

Website. Wikipedia: Onion Routing. https://en.wikipedia.org/wiki/Onion_routing. Accessed on or before Feb. 9, 2021. (1 pg).

International Search Report—International Application No. PCT/US2021/0171777 (3 pgs).

Written Opinion of the International Search Authority—International Application No. PCT/US2021/0171777 (6 pgs).

\* cited by examiner

TRUSTED LEDGER MANAGEMENT SYSTEMS AND METHODS

RELATED APPLICATION

This application claims the benefit of priority under 35 U.S.C. § 119(e) to U.S. Provisional Patent Application No. 63/091,876, filed Oct. 14, 2020, and entitled "HASH ADDRESSING SYSTEMS AND METHODS," the contents which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for improving the robustness of trusted ledgers. More specifically, but not exclusively, the present disclosure relates to systems and methods for improving the fault tolerance of trusted ledgers using managed ledger derivatives.

Trusted ledgers, which may comprise public trusted ledgers, may be used to securely record and/or manage a variety of information. For example, secure ledgers may record and/or manage information that may be used to determine information provenance, provide anonymous proof of attribution, ownership, and/or creation, provide the public a trusted way to audit and/or otherwise verify certain claims and/or assertions, and/or the like.

Consistent with various embodiments disclosed herein, trusted databases, ledgers, and/or the like, may be used to record and/or otherwise manage various assertions, bindings, attributes, identities, and/or the like associated with various entities. In some embodiments, trusted ledgers may be distributed in nature. Distributed trusted ledgers may be referred to in certain instances herein as trusted immutable distributed assertion ledgers ("TIDALs") and/or variations of the same. Ledgers may, in various embodiments, be public, private, and/or a combination thereof. In certain embodiments, a TIDAL may comprise a public indelible distributed database ("PIDD"). TIDALs may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

Trusted ledgers, including TIDALs, may be implemented, at least in part, using various blockchain technologies. Users of trusted ledgers may post entries into a sequenced database. Each entry may have an associated message, a signature of the message, and some associated deciphering key which others can use to verify that a person with the deciphering key's associated enciphering key has signed the message.

In various embodiments of the disclosed trusted ledgers, entries may be appended to the ledger. Each addition of an entry may be witnessed by a number of parties, which may be referred to in certain instances herein as ledger nodes, and entries may be accompanied by various auxiliary cryptographic information to ensure that changes to messages in the database and/or the ordering of entries can be detected. Entries may reside in a unique numerical position in the ledger, and once all witnesses agree to add an entry to the ledger, it may be difficult to alter an entry's presence, contents, and/or position in the ledger without detection by the witnesses.

Witnesses may take a variety of forms. For example, in blockchain-based cryptographic currencies, a witness may be any suitably configured computer. In other implementations, permissioned systems associated with independent entities and/or companies joined in a consortium may operate as witnesses.

Information stored in trusted ledgers, like all data, may be prone to faults. As ledgers grow larger with more entries, the risk of faults may increase over time and/or with the increasing size of the ledgers.

Embodiments of the disclosed systems and methods may help mitigate the risk of faults associated with the storage and management of trusted ledgers. Consistent with embodiments disclosed herein, trusted ledgers, which may comprise hash chained data blocks, TIDALs, and/or blockchain ledgers, may be "meshed" with other trusted ledgers in a manner that improves the ability to verify ledger entries and/or recover from data faults. Among other things, meshing may allow a verification process of a ledger to skip blocks that have errors while continuing to allow for verification at one or more points further down in the chain.

Consistent with embodiments disclosed herein, tagging processes may be performed to give semantic meaning to hashes included in trusted ledgers. For example, in a proof of work ledger such as a blockchain ledger, the proof of work rule may be modified such that a generated hash may have a certain semantic structure that may be used to provide information relating to the nature and/or character of an associated entry, operating as a sort of tag. For example, in some embodiments, the semantic structure of a particular entry in a ledger may identify the entry as a meshed entry with another trusted ledger and/or derivative ledger.

In further embodiments, meshing of ledger derivatives, which may comprise databases derived from other ledgers and/or TIDALs, can increase the reliability of those derivatives, and allow applications to better rely on the integrity of information provided in response to queries issued to those derivatives. In various embodiments, trusted agents may be employed to examine ledgers and/or derivatives, which may be meshed with other ledgers, to ensure the integrity of the ledgers examined by the trusted agents.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
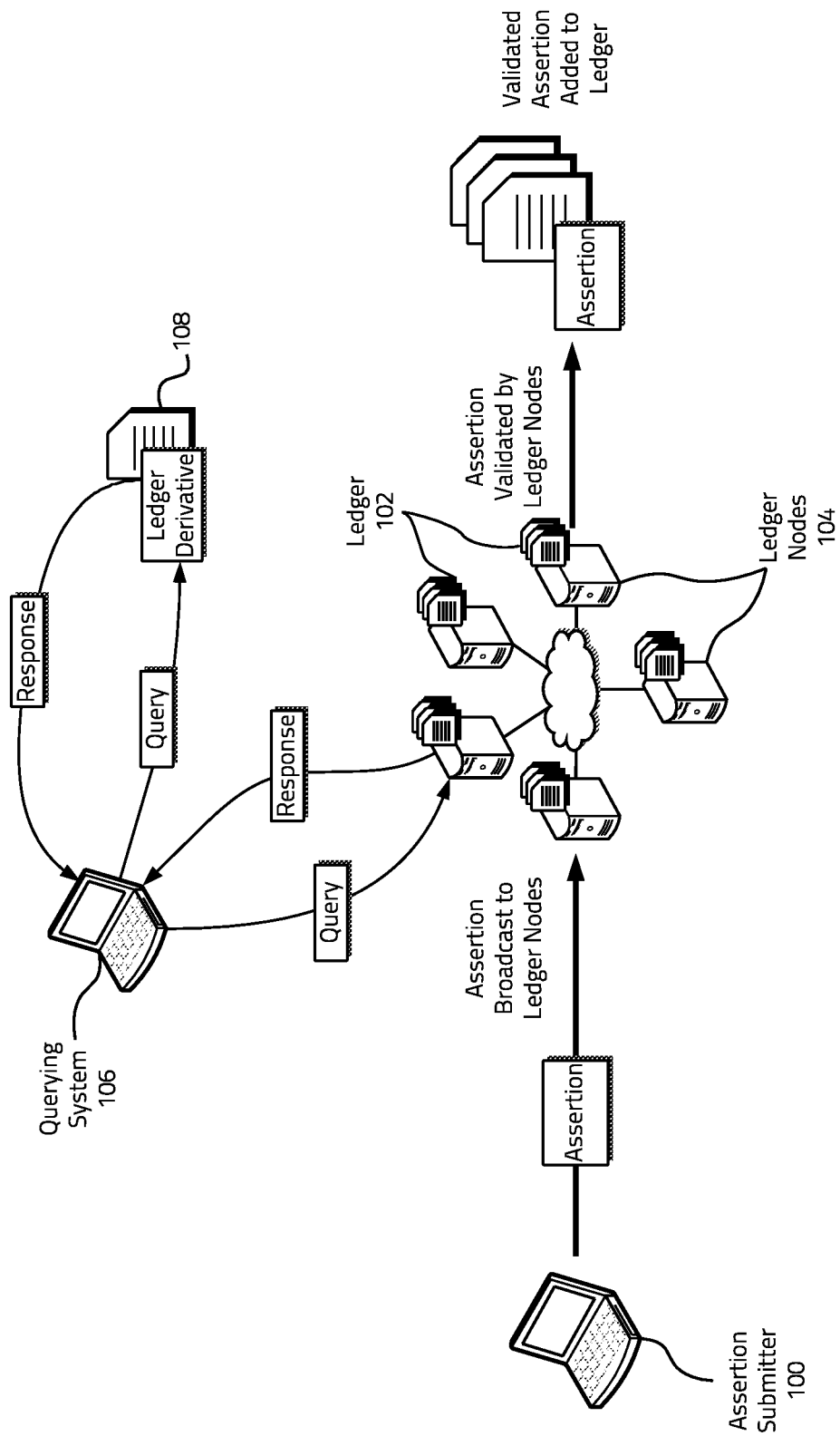
FIG. 1 illustrates an example of the management of a trusted ledger consistent with certain embodiments disclosed herein.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein provide a variety of techniques for, among other things, maintaining the integrity of trusted ledgers. Consistent with embodiments disclosed herein, trusted agents, which may comprise proxy agents and/or other test agents, may be employed to examine ledgers and/or derivatives, which may be meshed with other ledgers, to ensure the integrity of information provided by ledger operators. Ledger meshing techniques are described allowing for ledgers to be linked in a manner that improves processes to verify ledger entries and/or recover from data faults. In further embodiments, tagging processes may be performed to give semantic meaning to hashes included in trusted ledgers. Among other things, embodiments of the disclosed systems and methods may help mitigate the risks of errors, bengin of otherwise, occurring within trusted ledgers and provide trusted mechanisms for examining and validating the integrity of information provided by ledger operators.

Trusted Ledger Architecture and Management

Trusted ledgers consistent with various aspects of the disclosed embodiments, including TIDALs, may be associated with a variety of properties that may include one or more of:

Ledger processes that may be resistant to byzantine failures.

Entries that may be immutable.

Entries that may be time synched (at least in part). Distinguished sets of new entries (e.g., such as blocks in a blockchain) may have an immutable ordering whereby newer (e.g., more recent in actual time) entries may be relatively higher in order than earlier entries. In some instances, entries may be timestamped to identify a specific time of entry.

Ledgers may be scalable in number of entries.

Entries in a ledger may be available for relatively fast lookup and/or search.

In certain embodiments, scalability and fast lookup and/or search may be achieved and/or otherwise improved by using derivatives of a ledger, if not by the ledger itself.

Consistent with various disclosed embodiments, trusted ledger paradigms may comprise permissioned blockchains that use efficient byzantine agreement protocols. In some embodiments, ledger entries may comprise assertions, made by a class of qualified submitters, that each binds a key (and/or a hash or other derivative of a key) with other attributes that are associated with that key, such as the identity of the owner and/or an alias thereof, the scope of authority of the owner, information rights management permissions, and/or the like.

A ledger may be distributed among a plurality of nodes. A full node may have a full copy of the ledger. In certain embodiments, ledger actors, nodes, and/or entities may include assertion submitters, witnesses and/or verifiers, and/or distributed ledger node operators.

In certain implementations, a number of ledgers may be employed, each of which may specialize in the recording of various types of assertions with appropriate policies for the associated assertion types. In some embodiments, a given application may rely on the authenticity of multiple assertions and may either directly and/or indirectly query multiple ledgers. For example, a ledger may be indirectly queried when a ledger derivative is queried. In some embodiments, a ledger derivative may comprise one or more databases and/or ledgers derived from information recorded in one or more other ledgers.

In some embodiments, ledgers may be used to collect assertions and/or evidence of authority for a node that affirms such information, allowing multiple parties to cross check for compliance with policy. Ledgers may record the authentication information (e.g., a hash of the assertion) in public parts of the database and/or ledger. In certain instances, some applications may record the hash of encrypted information. Other applications, however, may record the hash of the information plaintext in a way such that access to the authentication information is governed and/or may be modified (e.g., nullified). Access to unhashed plaintext information may be governed by applicable policies.

In certain embodiments, a ledger may comprise a blockchain, although other database and/or ledger structures may be used. For example, hash graphs, tangles or directed, acyclic graphs and/or the like may also be used in connection with various aspects of the disclosed embodiments. In some embodiments, ledgers may be publicly readable, but in other embodiments they may not necessarily be publicly readable. For example, in connection with various aspects of the disclosed embodiments, ledgers may not necessarily be publicly accessible in every application, with some applications using multiple ledgers, some of which may be public and some private. Furthermore, in some embodiments, a ledger may be replaced and/or used in conjunction with a database that lacks some of the properties of a ledger, as may be the case for parts of a protocol where distributed trust is not necessarily required. In additional embodiments, information included in ledgers may be trusted through a variety of suitable cryptographic protection and/or other security techniques used in connection with recording, maintaining, and/or querying ledgers.

FIG. 1 illustrates an example of the management of a trusted ledger 102 consistent with certain embodiments disclosed herein. In certain embodiments, the trusted ledger 102 may be distributed in nature such as, for example and without limitation, in the case of a TIDAL, although aspects of the disclosed embodiments may also be used in connection with and/or any other suitable type of distributed database and/or ledger in any suitable form.

As illustrated, an assertion submitter 100 may submit an assertion for recordation in the ledger 102. In some embodiments, the assertion submitter 100 may comprise an entity and/or system that possesses credentials indicating authority to submit assertions for consideration to be recorded in the ledger 102. For example, in some embodiments, the assertion submitter 100 may comprise a user system, a name authority and/or other authority, and/or the like.

It will be appreciated that an assertion may comprise any type of data and/or information that may be recorded in a ledger, including any of the types of data and/or information described in connection with the various examples described herein. In some embodiments, an assertion may comprise associative information describing a relationship between different data and/or information. For example and without limitation, an assertion may comprise an association between data and/or information that identifies a user and/or an entity with fact information associated with the user and/or entity. In another non-limiting example, an assertion may comprise an association between data and/or information and/or an entity that generated and/or otherwise has rights associated with the data and/or information.

In some embodiments, an assertion may be generated based on a transformation of the subject associated data and/or information and/or portions thereof. For example and without limitation, an assertion may comprise a hash generated based on data and/or information that is the subject of the assertion. Other types of transformations are also contemplated. Thus it will be appreciated that various examples and embodiments of assertions described herein are provided for purposes of illustration and explanation, and not limitation.

In some embodiments, a submitted assertion may comprise an identifier associated with the assertion submitter 100 that may be used by various ledger nodes 104 in connection with a verification and/or witnessing process to determine whether the assertion submitter 100 has the requisite authority to make a submission of the specific type and/or with the scope reflected in the submitted assertion for inclusion in the ledger 102.

The submitted assertion may be broadcast to various ledger nodes 104 that may, among other things, maintain and/or otherwise manage the ledger 102 and in certain instances herein may be referred to as ledger management systems and/or nodes. In certain embodiments, at least a portion of ledger nodes 104 may be configured to verify submitted assertions prior to recordation of the assertions in the ledger 102. Consistent with various disclosed embodiments, assertions may be entered into the ledger 102 upon the agreement of multiple ledger nodes 104 operating as witnesses and/or verifiers. The ledger nodes 104 operating as witnesses and/or verifiers may verify the authenticity of the authority of the assertion submitter 100 to verify that the putative authority is in fact authorized to make the assertion in accordance with one or more applicable policies. In some embodiments, to verify the authenticity of the authority of the assertion submitter 100 to make the submitted assertion, the ledger nodes 104 may check previous entries in the ledger 102 and/or entries in other ledgers and/or associated ledger derivatives to verify that the assertion submitter 100 is authorized to make the submission to the ledger in accordance with applicable policy.

The ledger nodes 104, operating as witnesses, may verify a variety of information prior to recording a submitted assertion in the ledger 102. For example, the ledger nodes 104 may verify that an identifier submitted with the assertion (e.g., an ID of the assertion submitter 100, a public key, and/or the like) is valid and/or has not been revoked. The ledger nodes 104 may further verify that the submitter's scope of authority includes authority over the subject of the assertion. In certain embodiments, this may involve verifying prior submissions regarding the assertion submitter 100 included in the ledger 102.

In various embodiments, verified assertions may be placed into a pool to be entered into the ledger 102, and when a threshold number of ledger nodes 104 operating as witness agree regarding the authenticity and/or the actual authority of the assertion submitter 100 to make the assertion, the assertion may be recorded in the ledger 102. In certain embodiments, this agreement may be reached in accordance with an applicable agreement policy using, for example and without limitation, a byzantine agreement protocol and/or another suitable protocol. Once agreement has been reached, the assertion may be considered validated by the ledger nodes 104 and the submission may be recorded and/or otherwise entered into the ledger 102.

A querying system 106 interested in determining whether an assertion and/or a certain type of assertion (e.g., an assertion relating to a particular device and/or the like) has been recorded in the ledger 102 may be configured to query one or more of the ledger nodes 104 and/or other associated systems and receive associated responses. In various embodiments, the querying system 106 may query a system maintaining a ledger derivative 108, which may comprise one of the ledger nodes 104 and/or another system, and may receive associated responses indicative of assertions recorded in the ledger derivative 108 and/or the ledger 102.

Trusted Ledger Meshing

Hash functions such as, for example and without limitation, SHA256, may take a stream of bytes as an input and generate a relatively unique representation of the input in a shorter string of bytes. The string of bytes can be seen as a reference into a large address space. While this reference address may not necessarily be unique, the likelihood of a collision may be relatively low.

In a trusted ledger system, such as a blockchain ledger, blocks of data may be chained together by hash references. The references and the data blocks may be stored on a physical medium and may be subject to normal storage decay, which may occur randomly and/or somewhat randomly. To help mitigate storage decay, a variety of techniques may be employed including, for example and without limitation, implementing error correction codes, maintaining multiple ledger copies, and/or the like. These techniques may, in some circumstances, however, be vulnerable to non-correctable errors, which may be seen as a collision between a known correct block and a known incorrect block in error correction space. While non-correctable errors may be reduced in some implementations, eliminating them may prove challenging. In the event a non-correctable error is introduced in a blockchain ledger, the chain may not be verifiable from root to head.

Consistent with embodiments disclosed herein, trusted ledger meshing techniques may be used to, among other things, mitigate the risks caused by non-correctable errors and/or faults, thereby improving the fault tolerance of trusted ledgers. In certain embodiments, a trusted ledger may be meshed with other trusted ledgers in a manner that improves the ability to verify ledger entries and/or recover from data faults. In various embodiments, meshing may allow the verification process of a chain to skip blocks that have errors and continue the verification at a point later in the chain.

Figure 2:
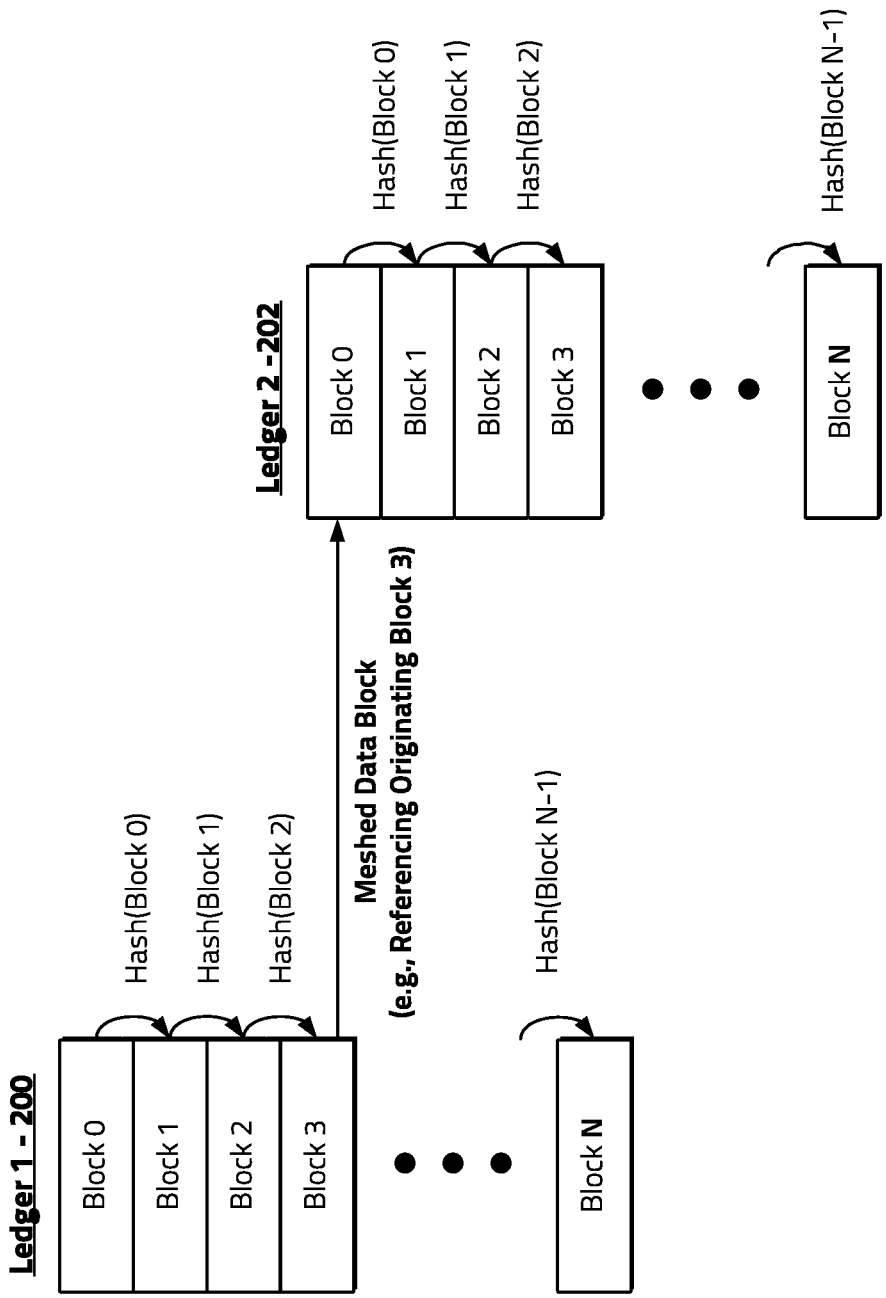
FIG. 2 illustrates an example of meshed trusted ledgers consistent with certain embodiments of the present disclosure.

FIG. 2 illustrates an example of meshed trusted ledgers 200, 202 consistent with certain embodiments of the present disclosure. As shown, a first ledger 200, which may comprise a hash chain ledger, may comprise a plurality of data blocks—block 0 through block N—chained together by a plurality of hash references. In certain embodiments, the first ledger 200 may comprise a trusted blockchain ledger such as, for example and without limitation, a TIDAL.

Consistent with various embodiments of the disclosed systems and methods, the first ledger 200 may be meshed with a second ledger 202. In some embodiments, meshing the first ledger 200 and the second ledger 202 may comprise submitting a block within the hash chain of the first ledger 200 as a data block serving as a root of a new second hash chain of the second ledger 202. For example, as illustrated, Block 3 of the first ledger 200 may be submitted as a root block—Block 0—of the second ledger 202.

In certain embodiments, a block in a ledger may reference another block in an associated meshed ledger. For example, in the illustrated ledgers, Block 3 of the first ledger 200 may reference block 0 of the second ledger 202. In some embodiments, a reference may not explicitly reference a particular block in another ledger, but instead may reference the meshed ledger generally. For example, Block 3 of the first ledger 200 may generally reference and/or otherwise identify the second ledger 202 as a ledger meshed with the first ledger 200 without explicitly referencing a particular block in the second ledger 202. Examining the entries of the ledgers 200, 202 may allow for identification of which blocks of the ledger are shared and/or otherwise meshed.

In some embodiments, a block meshing one or more ledgers may identify both a referenced block and/or ledger and an originating block and/or ledger. In this manner, examining such a block may allow for identification of the meshed block and/or associated ledger. For example, Block 3 of the first ledger 200 may reference Block 0 of the second ledger 202, itself, and/or the second ledger 202, and Block 0 of the second ledger may reference Block 3, itself, and/or the first ledger 200. In this manner, by examining Block 3 of the first ledger 200, it may be determined that the block is meshed with Block 0 of the second ledger 202 and/or the second ledger 202. Similarly, by examining Block 0 of the second ledger 202, it may be determined that the block is meshed with Block 3 of the first ledger 200 and/or the first ledger 200.

In various embodiments, blocks may explicitly reference another ledger and/or block. In further embodiments, a reference block may have a certain structure (e.g., a semantic structure) identifying the block as a reference block, but may not explicitly reference another ledger and/or block. In yet further embodiments, reference blocks may not include any unique information indicating their function as reference blocks. In such implementations, examining the entries of the ledgers 200, 202 may allow for identification of which blocks of the ledger are shared and/or otherwise meshed.

Blocks of a ledger that are used for meshing with other ledgers may be selected in a variety of suitable ways. For examples, in some embodiments, blocks may be randomly selected for use as a meshed reference between meshed ledgers. In some embodiments, random selection of meshed blocks may make the resulting meshed ledgers more robust against systemic errors. In various embodiments, meshing may provide a linked list in hash space where some blocks provide additional links to guard against errors that may break the original hash chain.

It will be appreciated that other methods for selecting meshing data blocks may also be employed. For example and without limitation, blocks may be selected for meshing pseudorandomly, periodically and/or at a specific time, after a particular number of ledger entries and/or a particular number of ledger entries after a preceding meshed block, following a specified duration of time following a more recent ledger entry, and/or the like.

Although the example illustrated in FIG. 2 shows a first ledger 200 and a second ledger 202 meshed in a single location, it will be appreciated that trusted ledgers may be meshed at multiple locations. For example and without imitation, in the illustrated ledgers 200, 202, multiple blocks of the first ledger 200 may be meshed with multiple blocks of the second ledger 202.

In some embodiments, multiple trusted ledgers may be meshed to mitigate potential failures and/or errors. For example, in certain embodiments, many chains may be meshed to create cross links between them to strengthen failure resistance. In this manner, a trusted ledger may be meshed with a plurality of other trusted ledgers. As discussed above, in some embodiments, links to a block following a root block in a blockchain ledger may be used as inputs to generate root blocks in new meshed blockchain ledgers. This meshing with multiple other ledgers may increase the robustness of the original blockchain ledger as references to the ledger may be found in multiple other locations.

In certain embodiments, meshing of ledgers consistent with the disclosed systems and methods may further provide a more accurate indication of a relative time entries are added to a ledger. For example, using multiple meshed ledgers, the entry of data into a ledger may be identified using multiple independent points of reference.

Consistent with various embodiments, if multiple nodes in a group of nodes maintaining a blockchain ledger submit meshing data to other nodes to mesh, a network of interconnected ledgers may be generated, thereby improving redundancy and error fault tolerance. A verification process may be aware of the additional link information such that a section of a trusted ledger that has been compromised by an error can be ignored and meshed ledgers not impacted by the error may be used for verification.

In certain blockchain ledger implementations, multiple chains may be operated by mutually antagonistic, cooperating nodes—that is, self-interested operators that cooperate with other operators in consideration of their own self benefit. In such an implementation, meshing trusted ledgers consistent with embodiments disclosed herein may increase the veracity of an assertion made on a ledger since the references to the ledger may be distributed to one or more other parties. The reference itself may be opaque to other chains, as it may comprise a relatively simple hash reference. Under such a circumstance, verification of a trusted ledger can draw from multiple sources with competing interests, thereby improving the veracity of the verification.

Semantic Tagging of Ledger Entries

In certain data architectures, pointers associated with a data object may be used to identify the type of the data object. In some implementations, this may be performed by designating some part of the address space to allow for indication of a particular data type (e.g., cons cells). Methods that interact with and/or operate on a data object can therefore be chosen by examining the reference.

Consistent with embodiments disclosed herein, data blocks (e.g., hashes) included in a trusted ledger may be associated with a semantic structure that operates a tagging mechanism. In various embodiments, ledger entries may be associated with one or more specified semantic structures that may be used to provide information relating to the nature, character, and/or type of an entry, operating as a tag. For example and without limitation, in some embodiments, the semantic structure of a particular entry in a ledger may identify the entry as a meshed entry with another trusted ledger and/or derivative ledger.

Figure 3:
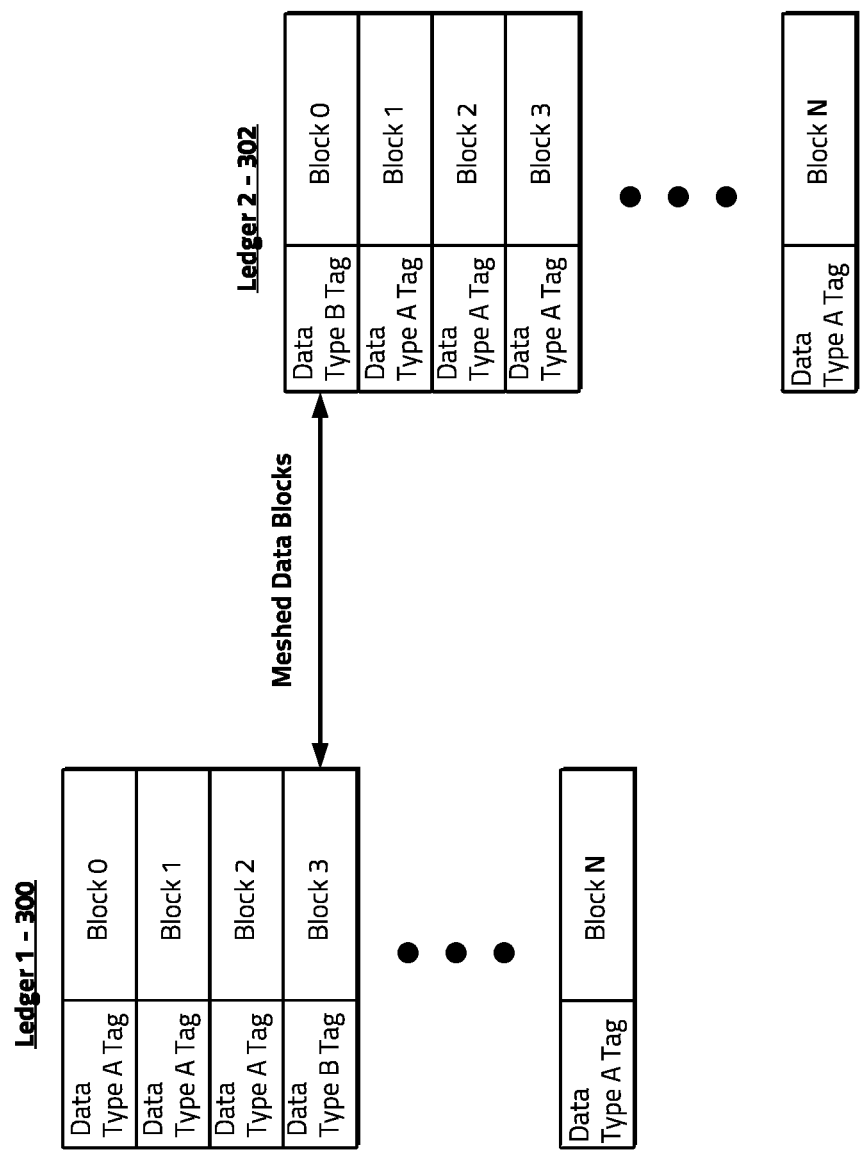
FIG. 3 illustrates an example of semantic tagging of ledger entries consistent with certain embodiments of the present disclosure.

FIG. 3 illustrates an example of semantic tagging of ledger entries consistent with certain embodiments of the present disclosure. As illustrated, a first ledger 300, which may comprise a hash chain ledger, may comprise a plurality of data blocks—block 0 through block N—chained together by a plurality of hash references. In certain embodiments, the first ledger 300 may comprise a trusted blockchain ledger such as, for example and without limitation, a TIDAL.

The first ledger 300 may be meshed with a second ledger 302, which may comprise a trusted blockchain ledger such as, for example and without limitation, a TIDAL. In some embodiments, meshing the first ledger 300 and the second ledger 302 may comprise submitting a block within the hash chain of the first ledger 300 as a data block serving as a root of a hash chain of the second ledger 302. For example, as illustrated, Block 3 of the first ledger 300 may be submitted a root block—Block 0—of the second ledger 302.

Consistent with embodiments disclosed herein, meshed data blocks of ledgers 300 and/or 302 may be identified using semantic tagging techniques as meshed and/or data blocks referenced by and/or referencing other data blocks and/or ledgers. For purposes of illustration, entries that are not meshed with and/or otherwise reference other data blocks and/or ledgers may be associated with a first data type—Data Type A. Entries that are meshed with and/or otherwise reference other data blocks and/or ledgers may be associated with a second data type—Data Type B. Identifying a data type associated with a particular entry may thus allow for differentiation between data blocks that mesh and/or reference other data blocks and/or ledgers and data blocks that do not mesh and/or reference other data blocks and/or ledgers.

In various embodiments, ledger entry data types may be designated using one or more associated semantic tags. In certain embodiments, a semantic tag may comprise a particular pattern included within an entry that designates an associated data type. In some embodiments, a semantic tagging convention, rule, and/or requirement may designate that the pattern is located at a particular location within a ledger entry (e.g., at the start, end, and/or at another location within an entry). For example and without limitation, a semantic tagging convention, rule, and/or requirement may designate that an entry associated with the particular data type complying with the semantic tagging convention, rule, and/or requirement be located at the beginning of a hash associated with a ledger entry. Examining the beginning of the hash may therefore allow for determining a data type associated with the entry (e.g., determining whether the entry is meshed and/or otherwise associated with another entry and/or ledger).

In at least one non-limiting example, a semantic tagging convention may specify that data blocks may be tagged by data type based on the blocks including a hash that starts with a particular hexadecimal number and/or series of numbers (e.g., "4A") associated with the associated data type. For example, blocks including a hash beginning with a first hexadecimal number and/or series of numbers may be associated with a first data type (e.g., Data Type A), and blocks including a hash beginning with a second hexadecimal number and/or series of numbers may be associated with a second data type (e.g., Data Type B). The type of data block may be determined by examining the beginning of a hash included in the data block and/or the associated semantic tag.

In various embodiments, semantic tags and/or conventions may be used to identify a data type (and/or other association) associated with all and/or a subset of entries in a trusted ledger. For example, in the illustrated ledgers 300, 302, semantic tags associated with Data Type A may be used to designate entries that are not meshed with and/or reference other entries and/or associated ledgers, and Data Type B may be used to designate entries that are meshed with and/or reference other entries and/or associated ledgers. In further embodiments, only a subset of trusted ledger entries may be tagged in accordance with a semantic tagging convention. For example, in some embodiments, only ledger entries that are meshed with and/or reference other entries and/or associated ledgers (or have some other feature and/or data type of interest) may be tagged semantically while certain other entries may not be tagged to conform with a semantic tagging convention.

It will be appreciated that semantic tagging consistent with various aspects of the disclosed embodiments may be used to tag and/or otherwise identify a variety of characteristics and/or information relating to an associated entry. For example and without limitation, semantic tagging consistent with various disclosed embodiments may be used to tag and/or otherwise identify information relating a ledger entry data type, associated ledger entry data originators and/or other parties and/or entities associated with the ledger entry and/or data, a data and/or entry class, and/or the like.

In some embodiments, a trusted ledger may include entries from multiple different stakeholders using the ledger to memorialize and/or otherwise record transactions that may be specialized in nature. For example, multiple types of ledger information, which may involve relative infrequent assertions and/or transactions, may be recorded in a single trusted ledger. In at least one non-limiting example, a single trusted ledger may be used to record transaction data relating to the ownership and/or transfer ownership of rare animals between zoological organizations as well as the ownership and/or transfer ownership of specialized equipment between research institutions that is not widely available. The relatively infrequency of ledger entries associated with each of the specialized types of transactions may make implementing a specialized and/or otherwise siloed trusted ledger less practical, robust, and/or secure, especially if it is distributed in nature as the number of stakeholders involved in maintaining the ledger may be limited. By combining such entries in a single ledger, however, a more trusted and robust mechanism with multiple stakeholders interested in maintaining the integrity of the ledger may be established. Consistent with embodiments disclosed herein, in such a ledger, different types of ledger entries may be identified in a ledger via adherence to semantic tagging conventions.

It will be appreciated that a variety of semantic tags, conventions, and/or associated tag structures may be used in connection with various disclosed embodiments. In various embodiments, such semantic tags, conventions, and/or structures may be expressed in one or more ledger entry rules and/or requirements associated with the different semantic tags that may be enforced and/or otherwise used by various stakeholders involved in recording entries and/or maintaining the trusted ledger.

Consistent with embodiments disclosed herein, in a proof of work ledger such as a blockchain ledger, a proof of work rule may be specified such that a generated hash conforms to an associated semantic tagging convention. In at least one non-limiting example, a blockchain ledger may be aware of two data types: Data Type A and Data Type B. An operating node may discover the type of data submitted to be included in a ledger in a variety of suitable ways (e.g., using different ports for different data type submissions, inspection of the data, and/or the like). A proof of work rule for Data Type A may be to find an integer that may be added to a block such that a hash of the result starts with, ends with, and/or otherwise contains with a particular hexadecimal number and/or series of numbers (e.g., "4A"). Similarly, a proof of work rule for Data Type B may be to find an integer that may be added to a block such that a hash of the result starts with, ends with, and/or otherwise contains a different particular hexadecimal number and/or series of numbers (e.g., "44").

Compliance with such a proof of work rule may allow for determining what type of data a hash references without losing a significant amount of hash entropy. Semantic tagging consistent with aspects of the disclosed embodiments, may allow for discrimination between meshing data (e.g., data referencing another meshed data block in a different hash chain) and regular data. In further embodiments, in a proof of stake ledger, entries from different stakeholders may be semantically tagged in a manner that identifies a stakeholder that validated a block transaction.

Trusted Proxy and Test Agents and Ledger Integrity Checking

Consistent with embodiments disclosed herein, trusted test agents may be employed to examine trusted ledgers and/or derivative ledgers, which may be meshed with other ledgers and/or derivatives, to ensure the integrity of the ledgers and/or derivatives examined by the trusted test agents. In various embodiments, trusted test agents, which may comprise a computer program and/or application executing on a ledger node, may examine and/or crawl through entries in a trusted ledger and/or a ledger derivative to check for consistency between the ledgers and/or derivatives and/or ledgers and/or derivatives maintained by the ledger node implementing the trusted test agent. In some embodiments, trusted test agents may use certain proxy techniques to ensure such integrity checking processes are not transparent to the ledger and/or ledger derivative nodes being checked, instead appearing as ledger queries issued by a querying system rather than a ledger node implementing the trusted test agent. In further embodiments, trusted test agents may be implemented as programs having certain defined privileges for examining ledger and/or ledger derivative entries for integrity.

As discussed above, in some embodiments, applications can use ledger derivatives to rapidly verify the authenticity of one or more assertions. Ledger derivatives may be derived from one or more TIDALs and/or other ledgers by constructing indexes of assertion hashes that have been entered into those TIDALs and/or other ledgers. In some embodiments, derivatives may remove or tag revoked and/or updated assertions, and may combine the hashes of two or more assertions in such a way that multiple assertions can be checked with relatively few queries and lookups (e.g., one query and one lookup). Other processing steps may be taken in a trusted manner to effectively preprocess the answers to queries in a trusted way, providing quick responses that may be made at a rapid rate and facilitating responses with low latency. Applications may rely on derivative node operators to perform these operations reliably, yet they can be subject to error and interference by nefarious agents or processes.

To increase the trustworthiness of derivatives generated based on subject TIDALs, ledgers, and/or blockchains, a ledger derivative can implement certain redundancy strategies including what may be referred to herein as a "common derivative blockchain" with multiple derivative nodes (which may be copies of the derivative indexes, the transaction logs used to process the derivatives, and/or the blockchain of the derivative transactions). In some embodiments, one or more of following methods may be used when implementing a common derivative blockchain:

Derivatives, much like blockchain databases, can have a multi-node redundancy configuration. They can also use a common (to the derivative nodes) blockchain that records derivative operations (such as formation of indexes, and removal and updating entries) into time-indexed transactions that can be entered into the common derivative blockchain. These entries can be meshed with other blockchains using embodiments of the blockchain meshing method described above.

To actively detect errant derivative nodes, trusted test agents (e.g., agents in the form of computer programs) can be spawned from any and/or all of the derivative nodes and/or from any other trusted source to crawl through the various derivative nodes, including the copies of the common derivative blockchain, checking for consistency. These trusted test agents can use random test strategies and test consistency of transaction recordings over a specific range of time. A trusted test agent coordination function can be implemented that randomly determines test strategies and/or ensures test coverage especially covering recent periods of time so that recent transactions will get test coverage. The test coordinator can collect and compare results and determine corrective action, that can include error repair, investigation, and/or indicating a general alarm.

Trusted test agents can appear as test programs with privileges, or they can pose as users of ledger and/or derivative ledger services and make queries from random IP addresses using, for example and without limitation, onion routing strategies.

To defend against operators of nefarious derivative copies, queries from applications can be routed either by user applications or by proxies to multiple derivative nodes. Applications can determine multi-query policies depending on need for low latency, high throughput, or for greater probability of correctness.

Figure 4:
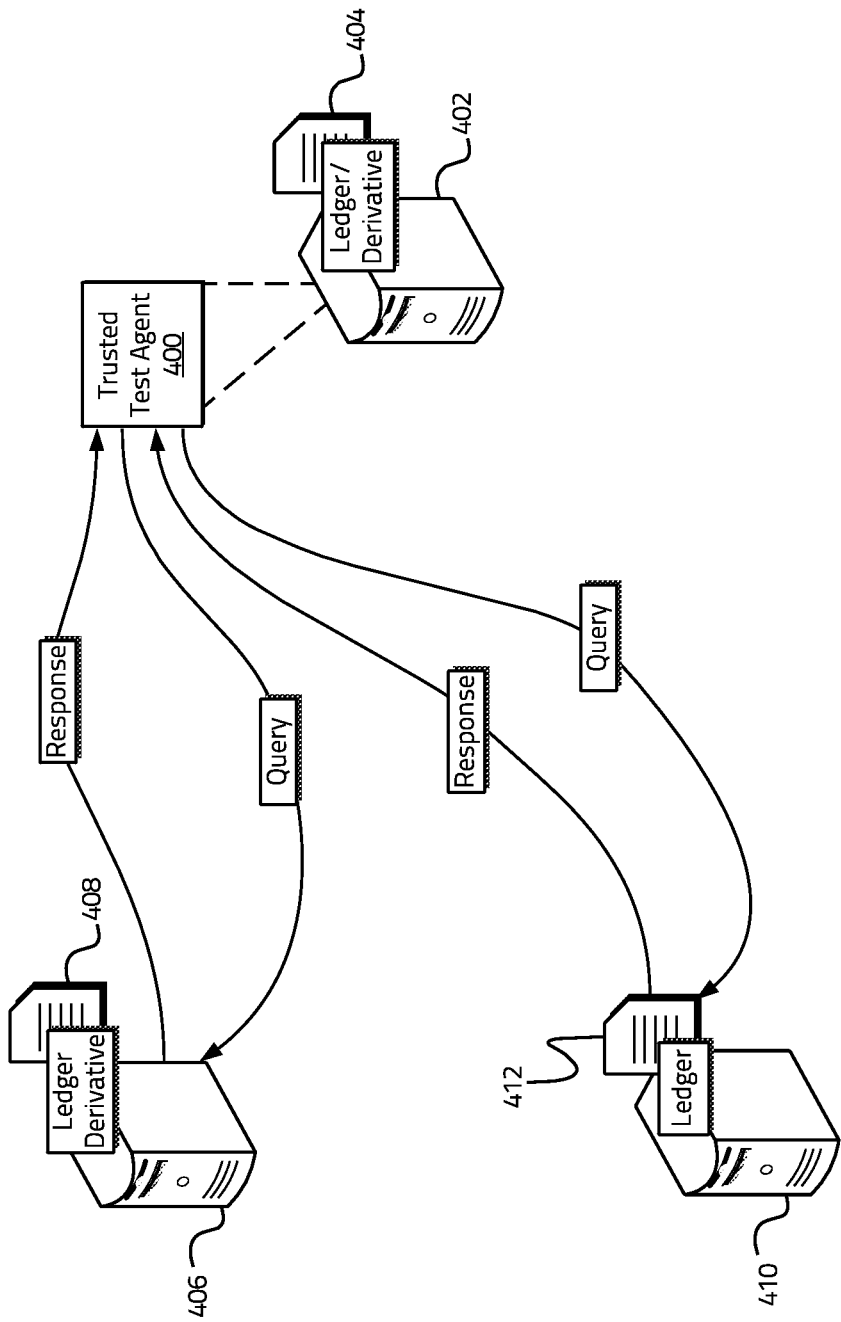
FIG. 4 illustrates an example of a trusted agent examining ledger entries for integrity consistent with certain embodiments of the present disclosure.

FIG. 4 illustrates a simplified example of a trusted test agent 400 examining ledger entries for integrity consistent with certain embodiments of the present disclosure. As illustrated, a trusted test agent 400 may be implemented by a ledger node 402 (e.g., as an application executing on the ledger node 402). The ledger node 402 may be configured to maintain a copy of a ledger and/or ledger derivative 404.

Consistent with embodiments disclosed herein, the trusted test agent 400 may interact with a ledger node 406 maintaining the ledger derivative 408 and/or a ledger node 410 maintaining the ledger 412 to check for consistency between the ledger and/or ledger derivative 404 maintained by ledger node 402 implementing the trusted test agent 400 with the ledger derivative 408 maintained by ledger node 406 and/or the ledger 412 maintained by ledger node 404. For example, as illustrated, the trusted test agent 400 may query the ledger 412 maintained by ledger node 410 and, based on a received response, may compare and/or cross check entries in the ledger 412 with the ledger and/or ledger derivative 404 maintained by the ledger node 402 implementing the trusted test agent 400 to identify possible inconsistencies. Similarly, the trusted test agent 400 may query the ledger derivative 408 maintained by ledger node 406 and, based on a received response, may compare and/or cross check entries in the ledger derivative 408 with the ledger and/or ledger derivative 404 maintained by the ledger node 402 implementing the trusted test agent 400 to identify possible inconsistencies.

If inconsistencies are identified by the trusted test agent 400, the trusted test agent 400 may implement one or more actions. For example and without limitation, the trusted test agent 400 may initiate an error repair action, which in some embodiments may comprise generating one or more corrective and/or reparative entries in ledgers and/or ledger derivatives 408, 412 correcting identified inconsistencies and/or errors, initiate an investigative action, which in some embodiments may involve a coordinated investigation action with one or more other ledger nodes 406, 410, initiating a general alarm to various stakeholders (e.g., ledger nodes 406, 410), recording entries in one or more ledgers and/or derivative ledgers, which may comprise a specialized derivative ledger, documenting the identified inconsistencies and/or errors, and/or the like.

Although the illustrated embodiments show the trusted test agent 400 being implemented by a ledger node 402 maintaining a ledger and/or a derivative ledger 404, it will be appreciated that in further embodiments, the trusted test agent 400 may be independent of any of the ledger nodes 402, 406, 410 and/or other nodes maintaining ledgers and/or derivative ledgers 404, 408, 412. For example, in some embodiments, the trusted test agent 400 may be implemented by an independent system and/or service configured to test and/or otherwise validate the integrity of the ledgers and/or ledger derivatives 404, 408, 412 maintained by ledger nodes 402, 406, 410.

Moreover, while the embodiments illustrated in FIG. 4 show a trusted test agent 400 interacting with a single ledger derivative 408 and/or ledger 412, it will be appreciated in further embodiments, the trusted test agent may interact with and/or cross check multiple ledgers and/or derivative ledgers that may be maintained by multiple ledger nodes to identify possible inconsistencies and/or errors. For example, a trusted test agent 400 may interact with a plurality of trusted ledgers operated by different ledger nodes, and possibly further interact with one or more associated ledger derivatives and/or associated nodes, to cross check the information included in ledgers and/or derivative ledgers for consistency.

In some embodiments, interactions between the trusted test agent 400 and/or the ledger nodes 406, 410 may be performed in a manner such that the ledger nodes 406, 410 may not be able to differentiate the queries issued by the trusted test agent 400 and/or the associated ledger node 402 from queries issued by other systems querying the ledgers and/or ledger derivatives. In this manner, queries issued by the test agent 400 may remain relatively anonymous and/or indistinguishable from other standard ledger queries. In various embodiments, a trusted test agent 400 may use certain proxy techniques to ensure such integrity checking processes are not transparent to the ledger and/or ledger derivative nodes being checked. For example and without limitation, the trusted test agent 400 may issue queries from random and/or different IP addresses using a variety of suitable techniques that may include onion routing strategies, although other proxy anonymization techniques may also be employed.

Figure 5:
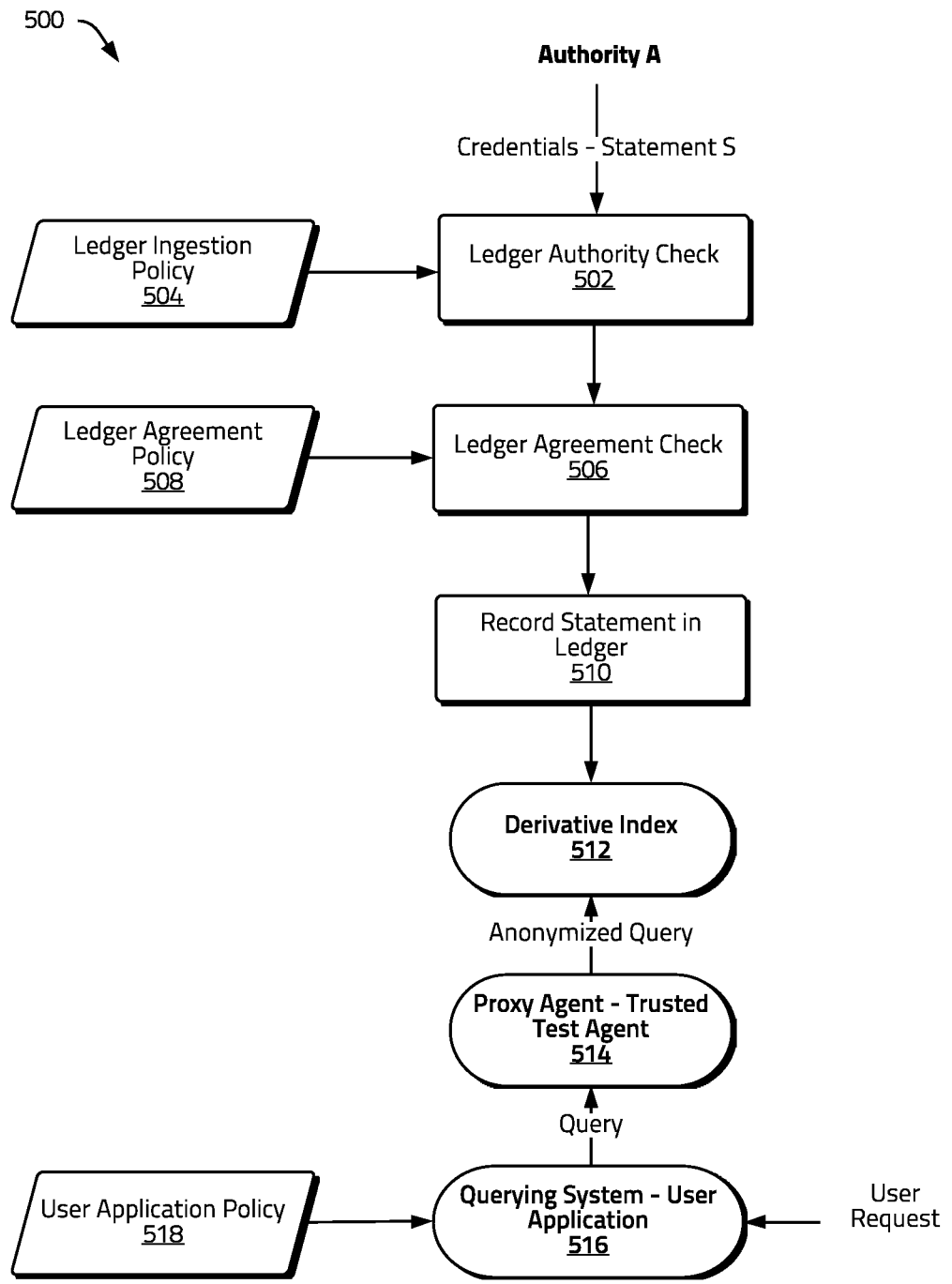
FIG. 5 illustrates a conceptual diagram of an example of a ledger verification process consistent with certain embodiments of the present disclosure.

FIG. 5 illustrates a conceptual diagram of a ledger entry and/or verification process 500 consistent with certain embodiments of the present disclosure. Various aspects of the illustrated process 500 may be performed by participants in trusted ledger ecosystem including, for example and without limitation, assertion submitters (which may comprise authorities), trusted authorities, ledger nodes, querying systems, trusted test agents and/or associated systems, and/or any other system and/or service configured to implement aspects of the disclosed embodiments.

Consistent with embodiments disclosed herein, methods may be used to cross check trusted ledgers and/or associated ledger derivatives with the goal of detecting errors given in response to queries issued by stakeholders that may wish to check the validity of a statement and/or assertion record in a ledger and/or a ledger derivative. Various disclosed methods may be used to check (e.g., check in advance continuously, periodically, and/or randomly) different copies of a trusted ledger and/or ledger derivative that may be maintained by different ledger nodes. Further embodiments may keep the sources of the ledger and/or ledger derivative validation queries anonymous, relatively anonymous, and/or otherwise make it difficult for a ledger node (e.g., a malicious ledger node) to distinguish a query issued by a trusted test agent from a query issued by a user application interacting with the ledger.

As illustrated in FIG. 5, an Authority A may submit a Statement S for inclusion in a trusted ledger that, in some embodiments, may comprise a TIDAL. The Statement S may comprise, explicitly or implicitly, one or more assertions. The statement may be in a variety of forms and/or structured in a variety of ways including, for example and without limitation, natural or formal language, in the form of a web-form of attribute-value pairs associated with a semantic mapping that provides meaning to the values of the form, and/or the like. In at least one non-limiting example, Authority A may wish to enter the statement "The URL with THISName has THISIPAddress and THISPublicValue" with values for each of the three attribute names (i.e., THISName, THISIP Address, and THISPublicValue). In some embodiments, the statement may be signed by and/or otherwise comprise a cryptographic signature associated with Authority A.

In the above example, aspects of the ledger entry and/or verification process 500 may allow a querying system and/or a user thereof to determine whether a provided IP address and public key associated with a particular URL are authentic and current through relatively simple and efficient querying of a trusted ledger. Various embodiments of the disclosed systems and methods may operate to ensure that errors that may impact such a query, benign or otherwise, are detected.

In various embodiments, a trusted ledger and/or derivative ledger may be maintained by multiple ledger nodes, each node maintaining the same and/or substantially similar ledgers and/or ledger derivatives. The Authority A may send a message including information for recordation in a trusted ledger. The message may be broadcast to multiple nodes maintaining the trusted ledger.

In some embodiments, the message may comprise the Statement S and/or identity and/or authority credentials for the submitting Authority A. The ledger nodes may check the Statement S, verify the identity and/or associated authority of the Authority A as the submitter (e.g., by checking a signature on the message), and/or parse Statement S to understand the topic and/or domain of the statement. In some embodiments, the topic and/or domain of the statement may be discerned from attribute names and/or values of the statement.

The ledger nodes may check at 502, using the credentials in the message, that the submitting Authority A has the authority to make the explicit and/or implicit assertions in the statement for recordation in the trusted ledger in accordance with a ledger entry ingestion policy 504. In some embodiments, each participating ledger node may have its own capability to perform this authority check. In some embodiments, ledger nodes may interact with other trusted ledgers and/or derivative ledgers to check the authority and/or authenticity of the credentials underpinning the assertion detailed in the statement.

One or more redundant ledger nodes may collaborate at 506 to determine whether they agree that Statement S should be entered into the trusted ledger (e.g., entered as a new block). In some embodiments, a ledger agreement policy 508, that may be specific to the domain and/or topic of Statement S, may be used to determine whether a sufficient number of ledger nodes agree that Statement S should be entered into the ledger. For example and without limitation, the ledger agreement policy 508 may articulate that the ledger nodes should engage in a voting process for acceptance of Statement S, with acceptance determined by results of the vote. In at least one non-limiting example, ledger nodes themselves may have certain stakeholder types, and the ledger agreement policy may require affirmation by a minimum number of stakeholders of each type. In further non-limiting examples, a ledger agreement policy 508 may require other suitable results such as those that may be used in multi-node agreement policies for blockchains (e.g., proof of work and/or proof of stake policies).

After successfully recording Statement S into the trusted ledger at 510, one or more derivative ledger operators may make derivative entries into different ledgers and/or indexes that they maintain that may allow users to find entries that validate queries made to the derivative ledger operators. In some embodiments, one or more of the ledger nodes may also function as derivative ledger operators maintaining derivative ledgers and/or indexes, although derivative operators may also be implemented by separate services, systems, and/or entities. In some embodiments, the derivative ledgers and/or indexes may provide information relating to various assertions that are explicit and/or implicit in the Statement S.

In some embodiments, a node implementing a ledger derivative may hash together two or more attribute values from a statement (e.g., Statement S) that was accepted to the trusted ledger, and then may enter the result into an ordered derivative index 512. In certain embodiments, this index may be ordered by the integer value of the hash. The node may further process the index by tagging and/or removing values that become invalided by the updating and/or revocation of a statement made by an authority in the trusted ledger (e.g., Statement S by Authority A).

A querying system 516 (e.g., a system executing a browser and/or other user application), may quickly determine the validity and currency of bindings between a URL, IP address, and public key value by hashing together the three putative values and then querying the ledger derivative operator to determine whether a match can be found in the derivative index. In some embodiments, this may be a relatively fast process.

In at least one non-limiting example, a user of a querying system 516 may request an action from a user application. For example, the user may request that a web page be loaded within a browser application. The user application may use application policy information 518 to determine what information needs to be authenticated in response to the user request and issue associated queries to trusted ledgers and/or a ledger derivatives index 512. As noted above, in some embodiments, these queries may be in the form of hash matching requests.

If a match is found, the derivative ledger operator may respond with an affirmative indication. In some embodiments, the response may further comprise a tag value that may indicate whether the assertion is currently valid, updated, revoked, expired and/or the like. If no match is found, a negative, null, and/or indeterminate indication may be returned.

In some embodiments, a querying system 516 may directly query a ledger and/or derivative ledger index 512. In further embodiments, queries may be routed through a proxy agent 514 (that in some embodiments may also implement a trusted test agent). The proxy agent and/or trusted test agent 514 may be associated with a separate system and/or service, and/or may be a service implemented by a ledger node participating in maintaining the trusted ledger and/or derivative ledger index.

Depending on the nature of requested information, an associated application, and/or a desired degree of reliability, the application policy information 518 may direct the querying system application to route queries through the proxy agent 514. The proxy agent 514 may, among other possible functions, issue the query from the querying system 516 anonymously to one or more ledger and/or ledger derivative nodes and, as discussed in more detail below, make queries to the ledger and/or ledger derivative nodes for comparison, cross-checking, and/or integrity verification checking.

In various embodiments, the proxy agent 514 may blind and/or otherwise anonymize a source address of the user application and/or the querying system. In some embodiments, the proxy agent 514 may forward the user query to multiple ledger nodes maintaining the ledger and/or derivative ledger index 512, receive multiple responses from the queried nodes, and return a response to the querying system 516 based on the received responses. In some embodiments, prior to returning a response to the querying system 516, the proxy agent 514 may check the responses received from multiple ledger nodes for consistency.

A variety of anonymizing and/or IP blinding techniques may be employed by the proxy agent 514 and/or trusted test agents including, for example, IP blinding, crowd anonymity techniques, onion routing, and/or the like. In some embodiments, using a proxy agent 514 and/or a trusted test agent may help ensure a ledger and/or ledger derivative node provides the same responses for queries originated from proxies (e.g., test agents) and/or from users through the proxies. In various embodiments, user application policy information 518 may articulate that multiple proxies should be used to limit the likelihood of a single point of failure.

As discussed above, in certain circumstances, errors may be introduced into one or more ledgers and/or derivative ledgers, thereby compromising the reliability and/or integrity of the ledgers and/or derivative ledgers. For example, errors may result from benign processes and/or from malicious actors and/or ledger node operators. Consistent with embodiments disclosed herein, trusted test agents, which may be implemented by the proxy agent 514 and/or by a separate agent and/or service, may be employed to examine ledgers and/or derivative ledgers, which may be meshed with other ledgers and/or derivatives, to ensure the integrity of the ledgers and/or derivatives examined by the trusted test agents. For example, in various embodiments, trusted test agents, which may comprise a computer program and/or application executing on a ledger node and/or by a separate system and/or service (e.g., a proxy agent 514), may examine and/or crawl through entries in a trusted ledger and/or ledger derivative to check for consistency between the ledgers and/or derivatives and/or ledgers and/or derivatives maintained by the ledger node implementing the trusted test agent.

Consistent with embodiments disclosed herein, the proxy agent 514 implementing a trusted test agent may make ledger and ledger derivative queries independent of actual users, but in the same and/or similar form as actual querying system 516 requests. Therefore, trusted test agent queries may not be readily distinguishable from actual user queries. In various embodiments, this may result in the ledger and/or derivative ledger nodes having limited ability to distinguish actual user queries from queries issued by trusted test agents. If malicious and/or otherwise compromised nodes are unable to reliably distinguish test agent queries from actual user queries, this may limit their ability adjust responses based on query source as a mechanism to avoid detection.

Figure 6:
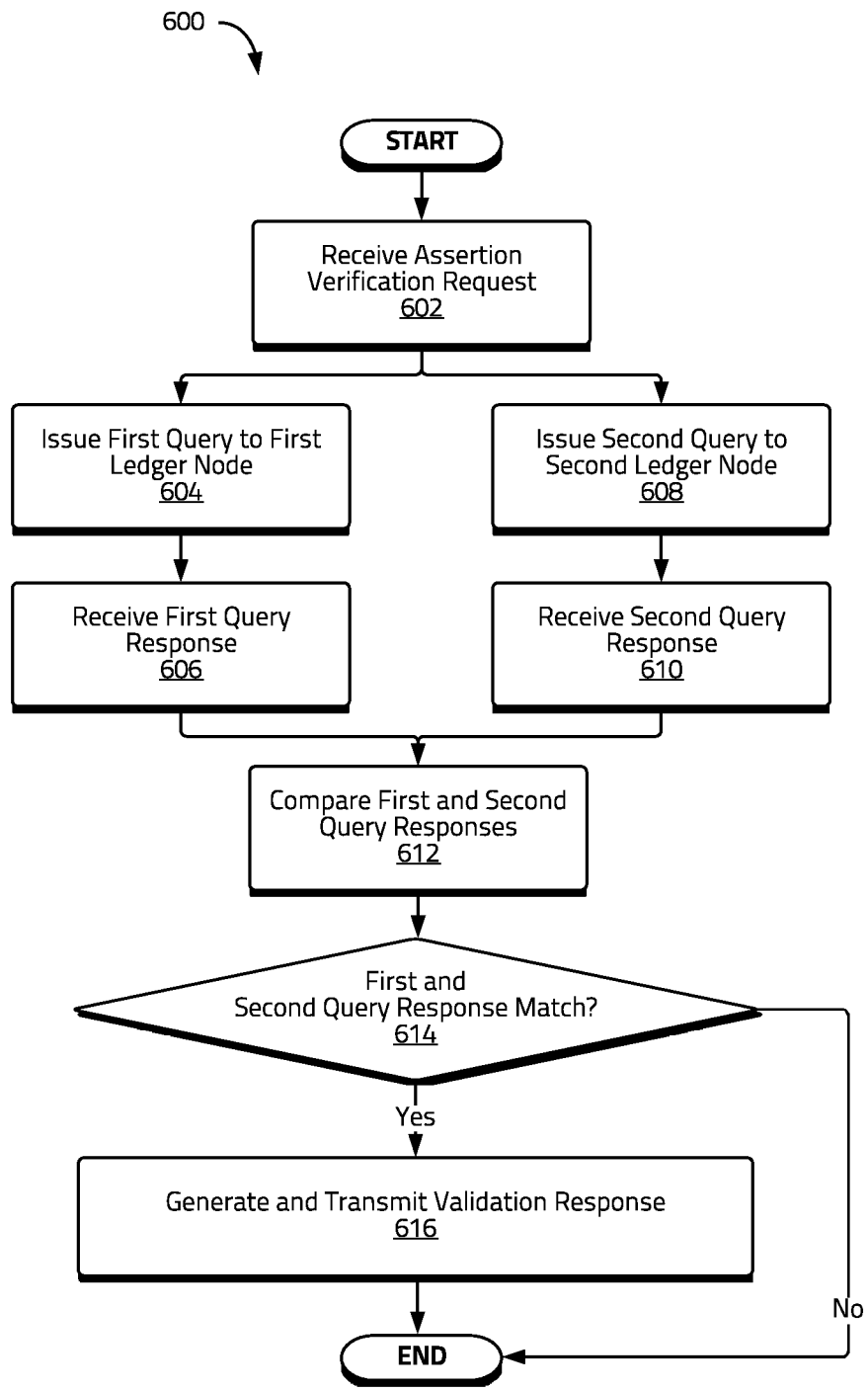
FIG. 6 illustrates a flow chart of an example of a method for verifying entries in a trusted ledger consistent with certain embodiments of the present disclosure.

FIG. 6 illustrates a flow chart of an example of a method for verifying entries in a trusted ledger consistent with certain embodiments of the present disclosure. The illustrated method 600 may be implemented in a variety of ways, including using software, firmware, hardware, and/or any combination thereof. In certain embodiments, various aspects of the method 600 and/or its constituent steps may be performed by a trusted proxy agent, which may execute on a ledger node and/or another system and/or service, and/or any other suitable system and/or services or combination of systems and/or services. In some embodiments, the trusted proxy agent may further implement a trusted test agent consistent with various aspects of the disclosed embodiments.

At 602, an assertion verification request may be received from a querying system. In some embodiments, the assertion verification request may comprise information relating to at least one assertion. In at least one non-limiting example, the at least one assertion may comprise and/or otherwise be related to an asserted association between a URL address, an IP address, and a public cryptographic key. In some embodiments, the assertion verification request may comprise a hash of information associated with the assertion.

In response to the assertion verification request, the trusted proxy agent may issue a first query to a first ledger node maintaining a first instance of a trusted distributed assertion ledger at 604. At 606, a first query response generated by the first ledger node based on the first query and the first instance of the trusted distributed assertion ledger may be received.

At 608, the trusted proxy agent may further issue a second query to a second ledger node maintaining a second instance of a trusted distributed assertion ledger at 604. A second query response generated by the second ledger node based on the second query and the second instance of the trusted distributed assertion ledger may be received at 610.

In some embodiments, the trusted proxy agent may anonymize the first and/or second queries prior to transmitting the queries to the respective ledger nodes. For example and without limitation, the trusted proxy agent may anonymize and/or blind the origin of the queries, an association with the querying system and/or an associated user and/or application, and/or the like. In some embodiments, onion routing, crowd anonymization, and/or other IP blinding techniques may be used.

In various embodiments, the first and second instances of the trusted distributed assertion ledger may comprise one or more cryptographically linked ledger entries and/or may be structured as a blockchain ledger. In certain embodiments, the ledger instances may comprise derivative ledgers with entries derived from at least a subset of entries of one or more other trusted ledgers (e.g., hash value entries and/or the like).

The first and second query responses may be compared at 612. At 614, based on the comparison, it may be determined whether the first instance of the distributed assertion ledger and the second instance of the distributed assertion ledger each comprise the at least one assertion. If so, the method 600 may proceed to 616, where an assertion verification and/or validation response may be generated and transmitted from the trusted proxy agent to the querying system. If both the first instance of the distribution assertion ledger and the second instance of the distributed assertion ledger do not comprise the at least one assertion, the method 600 may proceed to terminate, and/or response may be generated and transmitted from the trusted proxy agent to the querying system with an indication that the validation was not successful.

In certain embodiments, if the validation is not successful, the trusted proxy agent and/or querying system may act as a test agent, issuing queries to one or more other assertion ledger instances, potentially maintained by other ledger nodes, to identify whether the first instance and/or the second instance of the assertion ledger include errors and/or inconsistencies and/or associated potentially invalid entries. In some embodiments, the trusted proxy agent and/or querying system may reconstruct a trusted instance of the assertion ledger based on such queries. In some embodiments, if an assertion ledger comprises a derivative ledger, the trusted proxy agent and/or querying system may reconstruct an instance of the derivative ledger by querying one or more ledgers including information used to construct the derivative ledger.

Figure 7:
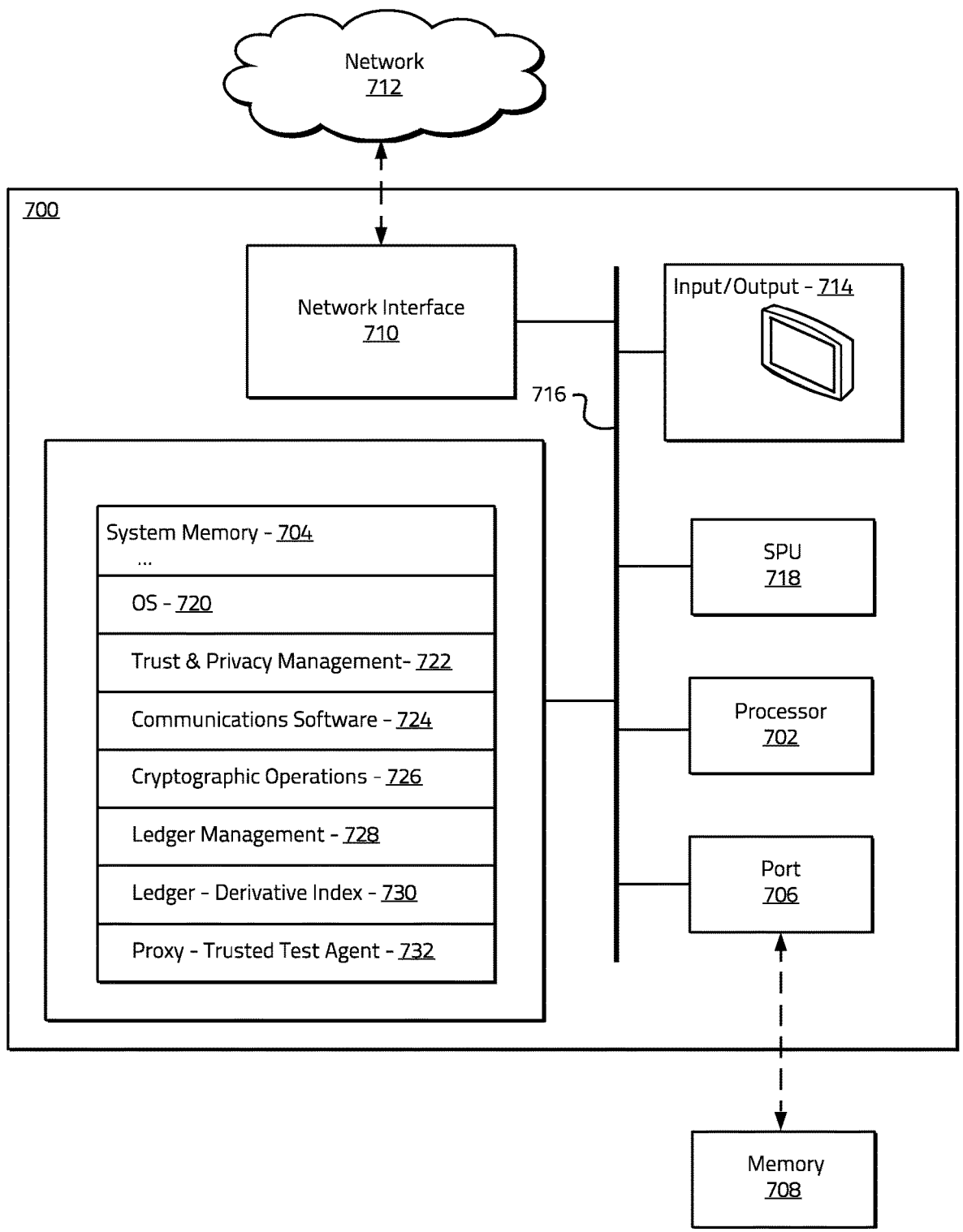
FIG. 7 illustrates an example of a system that may be used to implement certain embodiments of the systems and methods of the present disclosure.

FIG. 7 illustrates an example of a system 700 that may be used to implement certain embodiments of the systems and methods of the present disclosure. The system 700 may comprise a variety of computing devices and/or systems, including any computing system suitable to implement the systems and methods disclosed herein. In various embodiments, the system 700 may comprise a system and/or device associated with a user and/or querying system, an assertion submitter, a witness, trusted ledger node operator and/or trusted ledger management system, a trusted proxy and/or test agent, and/or any other service, system, device, entity, node, application and/or component configured to implement aspects of the embodiments of the disclosed systems and methods.

The various systems and/or devices used in connection with aspects the disclosed embodiments may be communicatively coupled using a variety of networks and/or network connections (e.g., network 712). In certain embodiments, the network 712 may comprise a variety of network communication devices and/or channels and may utilize any suitable communications protocols and/or standards facilitating communication between the systems and/or devices. The network 712 may comprise the Internet, a local area network, a virtual private network, and/or any other communication network utilizing one or more electronic communication technologies and/or standards (e.g., Ethernet or the like). In some embodiments, the network 712 may comprise a wireless carrier system such as a personal communications system ("PCS"), and/or any other suitable communication system incorporating any suitable communication standards and/or protocols. In further embodiments, the network 712 may comprise an analog mobile communications network and/or a digital mobile communications network utilizing, for example, code division multiple access ("CDMA"), Global System for Mobile Communications or Groupe Spécial Mobile ("GSM"), frequency division multiple access ("FDMA"), and/or time divisional multiple access ("TDMA") standards. In certain embodiments, the network 712 may incorporate one or more satellite communication links. In yet further embodiments, the network 712 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 7, the example system 700 may comprise: a processing unit 702; system memory 740, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 706 for interfacing with removable memory 708 that may include one or more diskettes, optical storage mediums (e.g., flash memory, thumb drives, USB dongles, compact discs, DVDs, etc.) and/or other non-transitory computer-readable storage mediums; a network interface 710 for communicating with other systems via one or more network connections and/or networks 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system.

In some embodiments, the system 700 may, alternatively or in addition, include a trusted execution environment and/or an SPU 718 that is protected from tampering by a user of the system or other entities by utilizing secure physical and/or virtual security techniques. A trusted execution environment and/or a SPU 718 can help enhance the security of sensitive operations such as personal information management, trusted credential and/or key management, privacy and policy management, and other aspects of the systems and methods disclosed herein. In certain embodiments, the trusted execution environment and/or SPU 718 may operate in a logically secure processing domain and be configured to protect and operate on secret information, as described herein. In some embodiments, the trusted execution environment and/or a SPU 718 may include internal memory storing executable instructions or programs configured to enable the SPU 718 to perform secure operations, as described herein.

The operation of the system 700 may be generally controlled by the processing unit 702 and/or an SPU 718 operating by executing software instructions and programs stored in the system memory 704 (and/or other computer-readable media, such as memory 708, which may be removable). The system memory 704 may store a variety of executable programs or modules for controlling the operation of the system. For example, the system memory may include an operating system ("OS") 720 that may manage and coordinate, at least in part, system hardware resources and provide for common services for execution of various applications and a trust and privacy management system 722 for implementing trust and privacy management functionality including protection and/or management of secure data through management and/or enforcement of associated policies.

The system memory 704 may further include, without limitation, communication software 724 configured to enable in part communication with and by the system, one or more applications, a cryptographic operation module 726 configured to perform various aspects of the disclosed embodiments (e.g., message generation, cryptographic key and hash generation operations, hash chain meshing, semantic tagging, etc.), a ledger management module 728 configured to perform various ledger management operations consistent with the disclosed embodiments, one or more distributed ledgers and/or ledger derivatives 730, a proxy agent and/or trusted test agent 732, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method performed by a trusted proxy agent executing on a system comprising a processor and a non-transitory computer-readable storage medium storing instructions that, when executed by the processor, cause the user system to perform the method, the method comprising:
    receiving, from a querying system, an assertion verification request, the assertion verification request comprising information relating to at least one assertion;
    issuing, in response to receiving the assertion verification request, a first query to a first ledger node maintaining a first instance of a trusted distributed assertion ledger;
    receiving, from the first ledger node, a first query response generated by the first ledger node based on the first query and the first instance of the trusted distributed assertion ledger;
    issuing, in response to receiving the assertion verification request, a second query to a second ledger node maintaining a second instance of the trusted distributed assertion ledger;
    receiving, from the second ledger node, a second query response generated by the second ledger node based on the second query and the second instance of the trusted distributed assertion ledger;
    determining, based on at least the first query response and the second query response, whether the first instance of the distributed assertion ledger and the second instance of the distributed assertion ledger each comprise the at least one assertion;
    generating an assertion verification response based, at least in part, on the determination; and
    transmitting the assertion verification response from the trusted proxy agent to the querying system.

2. The method of claim 1, wherein issuing the first query to the first ledger node comprises anonymizing an origin of the first query to the first ledger node.

3. The method of claim 1, wherein issuing the first query to the first ledger node comprises blinding an internet protocol address associated with the first query.

4. The method of claim 1, wherein issuing the first query to the first ledger node comprises anonymizing an association between the querying system and the first query.

5. The method of claim 1, wherein issuing the second query to the second ledger node comprises anonymizing an origin of the second query to the second ledger node.

6. The method of claim 1, wherein issuing the second query to the second ledger node comprises blinding an internet protocol address associated with the second query.

7. The method of claim 1, wherein issuing the second query to the second ledger node comprises anonymizing an association between the querying system and the second query.

8. The method of claim 1, wherein the first instance of the trusted distributed assertion ledger comprises cryptographically linked ledger entries.

9. The method of claim 8, wherein the first instance of the trusted distributed assertion ledger comprises a blockchain ledger.

10. The method of claim 1, wherein the second instance of the trusted distributed assertion ledger comprises cryptographically linked ledger entries.

11. The method of claim 10, wherein the second instance of the trusted distributed assertion ledger comprises a blockchain ledger.

12. The method of claim 1, wherein at least one of the first instance of the trusted distributed assertion ledger and the second instance of the trusted distributed assertion ledger assertion ledger comprise one or more entries derived from at least a subset of entries of one or more other trusted ledgers.

13. The method of claim 12, wherein at least one of the first instance of the trusted distributed assertion ledger and the second instance of the trusted distributed assertion ledger assertion ledger comprise one or more entries derived from hashing the at least a subset of entries of the one or more other assertion ledgers.

14. The method of claim 1, wherein the information relating to the at least one assertion comprises one or more of a uniform resource locator address, an internet protocol address, and a public cryptographic key.

15. The method of claim 1, wherein the information relating to the at least one assertion comprises a hash value.

16. The method of claim 15, wherein the hash value is calculated based on one or more of a uniform resource locator address, an internet protocol address, and a public cryptographic key.

17. The method of claim 1, wherein the method further comprises identifying the second instance of the trusted distributed assertion ledger based, at least in part, on a semantic structure of at least one entry in the first instance of the trusted distributed assertion ledger.

* * * * *